United States Patent Office 2,945,740
Patented July 19, 1960

2,945,740
RUTHENIUM DECONTAMINATION METHOD

Alan T. Gresky, Oak Ridge, Tenn., assignor to the United States of America as represented by the United States Atomic Energy Commission No Drawing. Filed Jan. 27, 1956, Ser. No. 561,962

12 Claims. (Cl. 23—14.5)

My invention relates to an improvement in decontaminating neutron-irradiated fissionable and fertile material of fission products, and more particularly to an improvement in decontaminating an aqueous uranium solution with respect to ruthenium in a solvent extraction process for the reclamation of reactor fuel.

In utilizing uranium as a fuel in a neutronic reactor, the uranium would ideally be left in the reactor until substantially all the uranium-235 or uranium-233 had undergone fission. In practice, however, the uranium is withdrawn from the reactor for decontamination from fission products long before all the fissionable material has been consumed. For example, uranium having the natural isotopic concentration may be withdrawn from a reactor after the concentration of uranium-235 has been reduced from an initial 0.71% to only approximately 0.64%. This is done to prevent the accumulation of excessive quantities of fission products having large neutron absorption cross-sections. An extremely small amount of such fission products has a highly deleterious effect on the reactivity of a reactor and may even threaten the continuance of the chain reaction. Furthermore, when the reactor is employed to produce plutonium as a primary product, the plutonium must be removed before it is permitted to concentrate to a point at which it undergoes fission at an uneconomically rapid rate relative to the production thereof, with a resulting decrease in yield. Since the uranium-235 or uranium-233 remaining in spent uranium reactor fuel constitutes a significant and valuable quantity of fissionable material, the economical recovery and decontamination of such fuel is of supreme importance in the economic development of an atomic energy program.

The processing of uranium reactor fuel differs from most chemical processing principally in that minor quantities of fission products must be separated from large quantities of substantially unchanged material. The chemical processing associated with the operation of nuclear reactors employing uranium fuel, therefore, generally has three primary objectives: the removal of fission product poisons from the remaining fuel; the reclamation of the fuel; and the recovery of plutonium or uranium-233, when desired.

Liquid-liquid solvent extraction processes are now generally employed for the processing of neutron-irradiated uranium. In brief, such processes proceed along lines of simultaneous extraction of the uranium and plutonium from an aqueous uranyl nitrate feed solution with a particular organic solvent, while confining substantially all the fission products to the aqueous solution, followed by separation of the plutonium and uranium thus extracted by preferential stripping of first one and then the other from the organic extract with slightly acidified water. Generally, the oxidation state of plutonium determines its distribution coefficient between organic and aqueous phases. Thus for extraction into the organic solvent together with uranium, plutonium is adjusted to the hexavalent state, and for subsequent stripping from the organic solvent, it is reduced to the trivalent state. For more details concerning uranium-plutonium solvent extraction processes, reference is made to the co-pending applications of the common assignee, S.N. 303,691, filed August 11, 1952 in the names of T. C. Runion, W. B. Lanham, Jr. and C. V. Ellison; S.N. 303,692, filed August 11, 1952 in the names of C. V. Ellison and T. C. Runion; and S.N. 318,072, filed October 31, 1952, in the names of G. T. Seaborg, W. J. Blaedel and W. T. Walling, Jr., for "Solvent Extraction Process." For details concerning a solvent extraction process for the separation of protactinium, thorium and uranium-233 from neutron irradiated thorium, reference is made to S.N. 602,686, filed August 7, 1956, in the names of A. T. Gresky et al. for "Process for Separation of Protactinium, Thorium and Uranium From Neutron-Irradiated Thorium."

In spite of the generally excellent decontamination of fissionable and fertile materials from fission products achieved by the foregoing solvent extraction processes, specific decontamination with respect to ruthenium has remained a serious problem. The difficulty in removing ruthenium by solvent extraction processes arises from the fact that this element can exist in several or all of its possible valence states in the same solution and also in different forms of molecular association, such as in polymers and complexes. It appears that the equilibrium between the various forms of ruthenium continuously shifts during the chemical processing, making it extremely difficult to stabilize ruthenium in a single state with a single, reproducible distribution coefficient between aqueous and organic phases and to remove all forms having high distribution coefficients in the organic phase. All these factors contribute to giving ruthenium its notorious reputation as the most difficult of all fission products to handle in the processing of neutron-irradiated fissionable materials.

In view of the difficulties experienced by the art in decontaminating neutron-irradiated fissionable and fertile material from ruthenium by solvent extraction processing, an object of my invention is to provide a method of improving decontamination with respect to ruthenium in such processing.

Another object is to provide a method of pretreating an aqueous mineral acid solution of neutron-irradiated uranium so as to greatly improve and facilitate decontamination with respect to ruthenium in subsequent solvent extraction processing.

Another object is to provide such a pretreatment method that is readily intergratable into an overall process for the decontamination of neutron-irradiated uranium.

Still another object is to provide such a pretreatment method that is relatively quick and simple and which may be performed with minimum adjustment of particular process solution conditions.

My present invention comprises, therefore, in a solvent extraction process for the recovery and decontamination of neutron-irradiated uranium, which includes the extraction of said uranium from an aqueous mineral acid feed solution with an organic solvent, the improvement of adding a relatively small amount of a low molecular weight organic ketone to said solution and digesting the resulting solution prior to said extraction.

My pretreatment method improves decontamination with respect to ruthenium in subsequent solvent extraction processing by at least one to two orders of magnitude. It is simple and easy to perform, and is readily integratable into any solvent extraction process without disrupting the overall cycle. Furthermore, and of great significance, fertile and fissionable material product losses are not increased. The exact chemistry of this treatment is not fully understood, but it is believed that an inert ruthenium complex is formed which is readily confined to the aqueous phase during extraction. This treatment has the additional benefit of improving zirconium decontamination by a factor of 10.

The organic ketone reagent should be of low molecular weight, organic ketones containing approximately 3–5 carbon atoms being particularly satisfactory. Methyl ethyl ketone is one suitable example, while acetone is the single preferred ketone. For clarity in presentation, my invention will hereinafter be illustrated in regard to acetone.

To effect my ruthenium decontamination method, an aqueous mineral acid solution of neutron-irradiated uranium (or plutonium) is contacted with at least approximately 0.5% acetone, by volume, and the resulting solution is digested at a temperature of at least 85° C. for at least approximately one hour. Preferably, approximately 1% acetone, by volume, is added to an aqueous uranyl nitrate solution of neutron-irradiated uranium and the resulting solution is then digested at approximately 90°–100° C. for approximately two hours; that is, until excess acetone is distilled from the solution. The so-treated solution may then be adjusted to the prescribed feed conditions for the particular solvent extraction process and processing continued.

The acidity of the aqueous mineral acid feed solution during the acetone pretreatment may vary over a considerable range, while still permitting efficient ruthenium decontamination. However, optimum results are obtained in the later solvent extraction processing by conducting the acetone pretreatment at fairly dilute acid concentrations. For example, an acidity of approximately 0.3 molar–0.4 molar nitric acid is preferred. Table I, below, shows this very clearly. In this instance, the pretreated feed material was processed by the previously identified Seaborg et al. method.

*Table I*

RUTHENIUM DECONTAMINATION AS A FUNCTION OF SOLUTION ACIDITY IN ACETONE PRETREATMENT

Feed:
  2.0 M $UO_2(NO_3)_2$
  0.3 M $HNO_3$
  0.1 M $Na_2Cr_2O_7$
  $1.9 \times 10^7$ c./m./ml.
Scrub:
  1.3 M $Al(NO_3)_3$
  0.3 M $HNO_3$
  0.1 M $Na_2Cr_2O_7$
Extraction ratio: F/S/O=1/1/2
Organic: Hexone 0.3 N $HNO_3$
Scrub ratio: S/O=1/1
All feeds were treated with 1% acetone.

| Normality of $HNO_3$ during Acetone Treatment | Ru in U Product Stream (cts./min./ml.) | Ru Decontamination Factor (initial activity in U)/(final activity in U) |
|---|---|---|
| Control—No Acetone Treatment | 28,000 | 55 |
| −0.45 N | 17,000 | 97 |
| −0.25 N | 15,000 | 105 |
| 0.00 N | 12,500 | 128 |
| +0.10 N | 6,400 | 247 |
| +0.20 N | 1,000 | 1,560 |
| +0.25 N | 600 | 3,800 |
| +0.30 N | 170 | 9,000 |
| +0.40 N | 280 | 6,000 |
| +0.50 N | 456 | 3,500 |
| +1.00 N | 570 | 2,700 |
| +2.00 N | 8,630 | 200 |

To still further enhance my ruthenium decontamination, if needed, I find that nitrite ion may be added to the uranyl nitrate solution prior to the acetone digestion. Apparently, the nitrite reacts with the ruthenium to form a ruthenium nitrite compound more amenable to the acetone action. Although various inorganic nitrite compounds may be satisfactorily employed, I find that alkali nitrite compounds are especially suitable, sodium nitrite being preferred. A satisfactory alkali nitrite concentration in the aqueous uranyl nitrate solution is at least approximately 0.02 molar, while approximately 0.1 molar is preferred.

In a preferred procedure for performing my invention, an aqueous uranyl nitrate solution of neutron-irradiated uranium is adjusted to approximately 0.3–0.4 molar nitric acid at approximately the ambient atmospheric temperature. Sodium nitrite is added to the solution to yield a concentration of approximately 0.1 molar and the resulting solution is agitated for about 15 minutes. Approximately 1% acetone, by volume, is then added and the resulting solution is digested for about 2 hours at approximately 90°–100° C. Afterwards it is cooled to about 25°–30° C. Following this, the digested solution is treated in accordance with the particular solvent extraction process.

The following examples are offered to illustrate my invention in further detail.

EXAMPLE I

An aqueous uranyl nitrate solution of neutron-irradiated uranium was adjusted to an acidity of 0.3 N $HNO_3$, 1% acetone, by volume, was added to the adjusted solution, and the resulting solution was digested at 92°–100° C. for about two hours until excess acetone was distilled from the solution. After this, the solution was adjusted to 0.3 N $HNO_3$, 2.0 M $UO_2(NO_3)_2$, and 0.1 M $Na_2Cr_2O_7$ (for plutonium oxidation), extracted with an organic solution of hexone, and scrubbed with an aqueous aluminum nitrate solution, all in accordance with the previously identified Seaborg et al. method. Table II gives the solvent extraction process conditions and compares the results obtained by my invention with control runs, and the vast improvement can readily be seen.

*Table II*

Feed:
  2.0 M $UO_2(NO_3)_2$
  0.3 M $HNO_3$
  0.1 M $Na_2Cr_2O_7$
Activity: $1.9 \times 10^7$ c./m./ml.
Scrub:
  1.3 M $Al(NO_3)_3$
  0.3 M $HNO_3$
  0.1 M $Na_2Cr_2O_7$
Extraction ratio: F/S/O=1/1/2
Organic: Hexone 0.3 M $HNO_3$
Scrub ratio: S/O=1/1

| Batch Stage | Untreated Control | | Treated Feed Solution | |
|---|---|---|---|---|
| | Decontamination Factor | Distribution Coefficient (O/A) | Decontamination Factor | Distribution Coefficient (O/A) |
| Extraction | 38 | 0.025 | 130 | 0.007 |
| Scrub #1 | 120 | 0.45 | $1.7 \times 10^3$ | 0.08 |
| Scrub #2 | 180 | 2.1 | $7.3 \times 10^3$ | 0.3 |
| Scrub #3 | 230 | 3 | $1.6 \times 10^4$ | 0.9 |

EXAMPLE II

Same as Example I, except that the feed solution was made 0.1 N in $NaNO_2$ prior to the digestion. Some additional decontamination was obtained as seen in Table III, below.

*Table III*

| Batch Stage | Decontamination Factor | Distribution Coefficient (O/A) |
|---|---|---|
| Extraction | 160 | 0.006 |
| Scrub #1 | $2.4 \times 10^3$ | 0.07 |
| Scrub #2 | $1.3 \times 10^4$ | 0.23 |
| Scrub #3 | $2.9 \times 10^4$ | 0.8 |

The foregoing examples are merely illustrative and should not be construed as limiting the scope of my invention. For example, my pretreatment method can be very satisfactorily employed with any of the previously identified solvent extraction processes of the common assignee. Therefore, my invention should be limited only as is indicated by the appended claims.

Having thus described my invention, I claim:

1. In a solvent extraction process for the decontamination of neutron-irradiated uranium which includes the extraction of said uranium from an aqueous mineral acid feed solution with an organic solvent, the improvement of adding a low molecular weight organic ketone to said solution in the amount of at least 0.5 percent, by volume, and digesting the resulting solution at a temperature of at least approximately 85° C. prior to said extraction.

2. The method of claim 1, wherein said organic ketone contains approximately 3–5 carbon atoms.

3. The method of claim 2, wherein said organic ketone is methyl ethyl ketone.

4. The method of claim 2, wherein said organic ketone is acetone.

5. The method of claim 1, wherein said mineral acid solution in a nitric acid solution and said organic ketone is acetone.

6. In a solvent extraction process for the decontamination of neutron-irradiated uranium, which includes the extraction of said uranium from an aqueous nitric acid solution with an organic solvent, the improvement of adjusting the acidity of said nitric acid solution to approximately 0.3–0.4 normal, adding approximately 1% acetone, by volume, to the adjusted solution and digesting the resulting solution at approximately 90°–100° C. for approximately 2 hours prior to said extraction.

7. In a solvent extraction process for the decontamination of a neutron-irradiated uranium which includes the extraction of said uranium from an aqueous mineral acid feed solution with an organic solvent, the improvement of adding nitrite ion as a soluble inorganic nitrite and an organic ketone containing approximately 3–5 carbon atoms to said feed solution the resulting solution being at least approximately 0.02 molar in nitrite ion and containing at least approximately 0.5 percent by volume of said ketone and digesting the resulting solution at a temperature of at least 85° C. prior to said extraction.

8. The method of claim 7, wherein said aqueous mineral acid feed solution is a nitric acid solution.

9. The method of claim 8, wherein said nitrite ion is added to said solution as an alkali nitrite.

10. The method of claim 9, wherein said organic ketone is acetone.

11. The method of claim 10, wherein the acidity of said nitric acidic solution is adjusted to approximately 0.3–0.4 normal.

12. The method of claim 11, wherein the digestion is conducted for at least approximately 1 hour.

References Cited in the file of this patent

UNITED STATES PATENTS 2,811,415    Seaborg _____ Oct. 29, 1957

OTHER REFERENCES

Berkman et al.: U.S. Atomic Energy Comm., declassified paper No. ANL–4573, Jan. 1951—declass. Jan. 5, 1956, 21 pages. Available from OTS, Dept. of Comm., Wash. 25, D.C. 25¢ per copy.